(12) United States Patent
Tribbensee et al.

(10) Patent No.: US 10,320,789 B1
(45) Date of Patent: Jun. 11, 2019

(54) FAST AND SECURE WAY TO FETCH OR POST DATA AND DISPLAY IT TEMPORARILY TO A USER

(71) Applicant: Actioneer, Inc., Charlestown, MA (US)

(72) Inventors: Bruce Tribbensee, Missoula, MT (US); Thomas Hagan, Boothbay, ME (US)

(73) Assignee: Actioneer, Inc., Charlestown, MA (US)

( * ) Notice: Subject to any disclaimer, the term of this patent is extended or adjusted under 35 U.S.C. 154(b) by 3 days.

(21) Appl. No.: 14/226,812

(22) Filed: Mar. 26, 2014

(51) Int. Cl.
H04L 29/06 (2006.01)

(52) U.S. Cl.
CPC .................. H04L 63/10 (2013.01)

(58) Field of Classification Search
CPC .............. H04L 63/10; H04L 63/108
See application file for complete search history.

(56) References Cited

U.S. PATENT DOCUMENTS

| | | | |
|---|---|---|---|
| 5,115,504 A | 5/1992 | Belove et al. |
| 5,339,432 A | 8/1994 | Crick |
| 5,371,807 A | 12/1994 | Register et al. |
| 5,390,281 A | 2/1995 | Luciw et al. |
| 5,404,488 A | 4/1995 | Kerrigan et al. |
| 5,414,841 A | 5/1995 | Bingham et al. |
| 5,418,948 A | 5/1995 | Turtle |
| 5,454,106 A | 9/1995 | Burns et al. |
| 5,477,447 A | 12/1995 | Luciw et al. |
| 5,530,852 A | 6/1996 | Meske et al. |
| 5,544,305 A | 8/1996 | Ohmaye et al. |
| 5,621,903 A | 4/1997 | Luciw et al. |
| 5,634,121 A | 5/1997 | Tracz et al. |
| 5,644,735 A | 7/1997 | Luciw et al. |
| 5,659,794 A | 8/1997 | Caldarale et al. |

(Continued)

FOREIGN PATENT DOCUMENTS

| | | |
|---|---|---|
| EP | 0615201 A2 | 9/1994 |
| EP | 0697671 A | 2/1996 |
| WO | 9641288 A | 12/1996 |

OTHER PUBLICATIONS

Bruene, Jim, "Cash Tank from Westpac NZ, a Mobile NoLogin Balance Display," <www.netbanker.com/2012/03/cash_tank_from_westpac_nz_a_mobile_no-login_balance_display.html>, Mar. 19, 2012, 3 pages.

(Continued)

*Primary Examiner* — Esther B. Henderson
(74) *Attorney, Agent, or Firm* — HIPLegal LLP; Judith Szepesi

(57) ABSTRACT

A method for interacting with one or more data resources is disclosed which decreases necessary user actions and improves security. In one embodiment, the method comprises detecting the selection of a desired action to fetch data, obtaining that data from a data source associated with the action, and displaying the data to a user for a display period. The method comprises automatically restoring the device to a prior state after the end of the display period, eliminating the need for the user to do so. In one embodiment, this also ensures that the data is no longer present on the device. In one embodiment, the method includes automatic logout for secure data sources, eliminating the need for the user to logout, and improving security of the data resource. In one embodiment, the method can also post data to a data resource more securely and easily.

20 Claims, 7 Drawing Sheets

(56) References Cited

U.S. PATENT DOCUMENTS

| | | | |
|---|---|---|---|
| 5,732,274 | A | 3/1998 | O'Neill |
| 5,749,079 | A | 5/1998 | Yong et al. |
| 5,765,028 | A | 6/1998 | Gladden |
| 5,778,355 | A | 7/1998 | Boyer et al. |
| 5,778,362 | A | 7/1998 | Deerwester |
| 5,805,152 | A | 9/1998 | Furusawa |
| 5,805,775 | A | 9/1998 | Eberman et al. |
| 5,813,014 | A | 9/1998 | Gustman |
| 5,819,282 | A | 10/1998 | Hooper et al. |
| 5,864,848 | A | 1/1999 | Horvitz et al. |
| 5,864,865 | A | 1/1999 | Lakis |
| 5,893,092 | A | 4/1999 | Driscoll |
| 5,963,940 | A | 10/1999 | Liddy et al. |
| 5,966,652 | A | 10/1999 | Coad et al. |
| 5,974,448 | A | 10/1999 | Yamauchi et al. |
| 5,996,010 | A | 11/1999 | Leong et al. |
| 6,026,388 | A | 2/2000 | Liddy et al. |
| 6,026,410 | A | 2/2000 | Allen et al. |
| 6,052,121 | A | 4/2000 | Webster et al. |
| 6,085,201 | A | 7/2000 | Tso |
| 6,360,280 | B1 | 3/2002 | Jones |
| 6,622,147 | B1 | 9/2003 | Smiga et al. |
| 7,017,188 | B1 | 3/2006 | Schmeidler et al. |
| 7,254,606 | B2 | 8/2007 | Hamada |
| 7,430,758 | B2 | 9/2008 | Toutonghi |
| 7,624,437 | B1 | 11/2009 | Fagundo et al. |
| 2002/0188565 | A1* | 12/2002 | Nakamura ........... G06Q 20/108 705/42 |
| 2003/0140097 | A1 | 7/2003 | Schloer |
| 2004/0139328 | A1 | 7/2004 | Grinberg et al. |
| 2004/0261025 | A1 | 12/2004 | Rizk et al. |
| 2007/0261116 | A1 | 11/2007 | Prafullchandra et al. |
| 2012/0109818 | A1* | 5/2012 | Carlson ................ G06Q 20/10 705/39 |
| 2014/0324692 | A1* | 10/2014 | Yarbrough ........... G06Q 20/322 705/42 |

OTHER PUBLICATIONS

Bruene, Jim, "Commonwealth Bank's Kaching App Has NoLogin, Option, Simple Balance," <www.netbanker.com/2012/03/commonwealth_banks_kaching_app_has_no-login_option_simple_balance.html>, Mar. 15, 2012, 2 pages.

Bruene, Jim, "Mobile Monday: Bank of the West is First in USA with NoLogin Pulldown Balance Lookup," <www.netbanker.com/2013/04/mobile_monday_bank_of_the_west_is_first_in_usa_with_no-login_pulldown_balance_lookup.html>, Apr. 1, 2013, 3 pages.

Bruene, Jim, "Southern Bancorp Launches 'Shake and Bank' iPhone App Aimed at Youth," <www.netbanker.com/2011/04/southern_bancorp_launches_shake_and_bank_iphone_app_aimed_at_youth.hmtl>, Apr. 25, 2011, 2 pages.

CommBank Kaching, "CommBank Kaching FAQS," <https://www.commbank.com.au/mobile/commbank-kaching/kaching-support.html>, Accessed Jan. 10, 2014, 8 pages.

Fraz, Firdaus, "Flexible Manipulation of Session Timeout for Oracle Identity Manager Web Applications," <http://www.oracle.com/technetwork/articles/idm/fraz-oim-session-timeout-2120987.html>, Jan. 2014, 4 pages.

GoBankOfficial, "GoBank Launch Event," <http://www.youtube.com/watch?v=IWP8veXBxbY>, Published Jan. 21, 2013, 2 pages.

Login Durations, <http://forum.opencarry.org/forums/showthread.php?120749-Login-Durations>, Accessed Mar. 26, 2014, 6 pages.

OWASP, "Session Timeout," <https://www.owasp.org/index.php/Session_Timeout>, Last Modified Aug. 20, 2013, 2 pages.

Southern Bancorp, "Shake & Bank," <https://banksouthern.com/shake-bank/>, Accessed Jan. 13, 2014, 1 page.

Wohlsen, Marcus, "New Bank Has No Branches, Just an App—And Thinks You'll Volunteer to Pay for It," <www.wired.com/business/2013/01/go-bank-pay-what-you-want/>, Jan. 16, 2013, 10 pages.

"AI RoboForm," Siber Systems, <http://web.archive.org/web/20000302052206/http://www.roboform.com/>, Updated Feb. 5, 2000, 2 pages.

AgileBits, <https://app-updates_agilebits.com/product_history/OPM4>, Released on May 19, 2006-Apr. 18, 2007, 31 pages.

* cited by examiner

FAST AND SECURE WAY TO FETCH OR POST DATA AND DISPLAY IT TEMPORARILY TO A USER

FIELD

The present invention relates to a fast and secure way to interact with a data resource, and more particularly to providing temporary information to a user with higher security and requiring fewer user actions.

BACKGROUND

On mobile devices, users can access a plethora of information, whether it be their bank balance or the weather. In general, the information is obtained by the user executing a series of actions to obtain this information, logging in if needed, and requesting the information.

Data is usually made available for viewing by opening a page showing the data on the user's device. The page on the device stays open while the data is viewed and stays open until the user takes action to close it. If login is employed to restrict access to the data, the user is left logged into the data source during a session while viewing the data and afterwards, unless the user logs out before moving to another task. After a period of inactivity, the host system generally logs the user out. The result is a protracted period of time during which the user is logged in, extended by the time-out period unless the user executes the logout action. During the time the user is logged in viewing data and for the time-out period, the host site is in increased danger from unauthorized access, because its security is lower during login.

In addition to logging out, the user's device must be returned to its state prior to executing the action to view data, so it will be ready for its next use. This requires an additional user action to return the device to that state, after viewing either open or password-protected data.

Similarly, posting data to a secure repository typically entails opening the repository, logging in, and keeping the site open and logged into while manually accomplishing the desired posting, and then logging out.

An alternative method of making data more readily available to users, such as bank balances or weather updates, is possible and may now be coming into use. This method pushes data to the user's device whenever the data changes. Push technology has a number of disadvantages. First, it uses more bandwidth, because the data pushes are likely to be more frequent than the user's need to check the data. Furthermore, push technology is more difficult to implement, and it must be done in multiple versions for different browsers and devices. Additionally, it is less secure, because it keeps the data on the device, making the data available to anyone who can retrieve it from the user's device.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
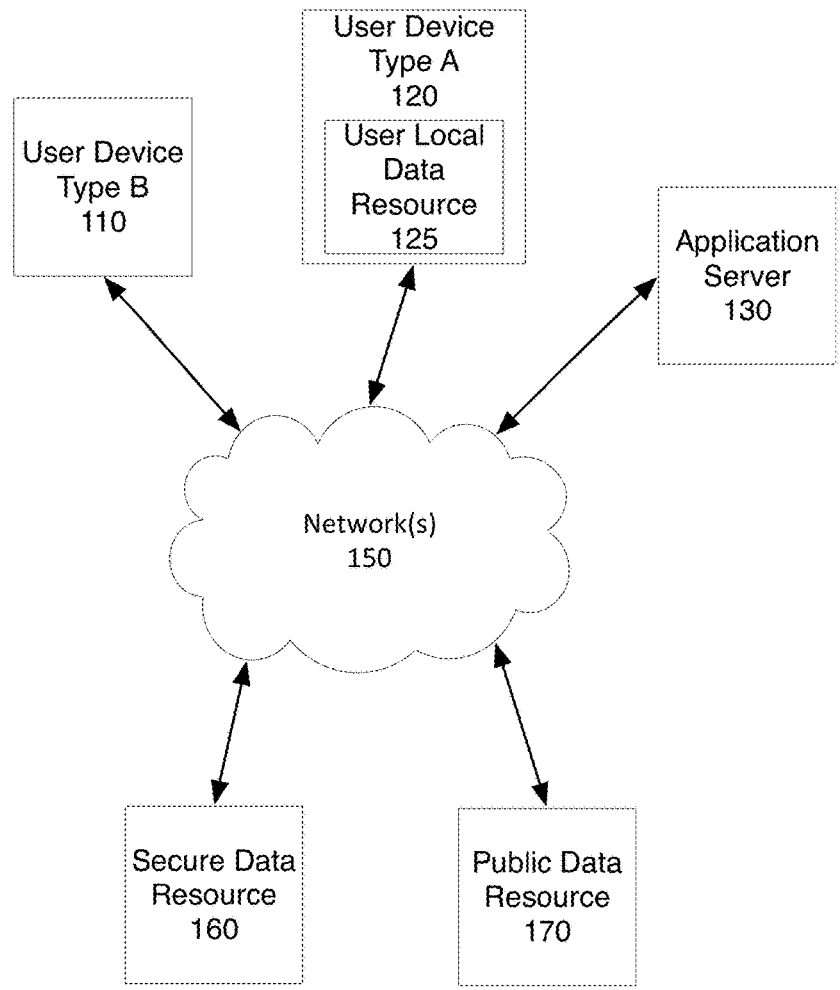
FIG. 1 is a network diagram of one embodiment of a system in which the present invention may be implemented.

This invention enables a user with a computer, such as a phone, a tablet, a laptop or a desktop computer, to more easily interrogate a data resource for data or post data to a data resource. The data resource may be a local database, a remote website, or other data resource. Examples include getting the current temperature from an open public website, getting a current balance of a bank account from a password-protected website, getting a calendar item from a local calendar, or posting to a secure health site. In one embodiment, this can be done with a single touch, including the termination of the display. A user clicks on an icon, button, indicator, window, or other activating mechanism associated with a Snap Action. The Snap Action may be an application, a part of an application, a feature added to an application, or be implemented in another way to make the SA available on a user's device. For simplicity, for the remainder of this application, the activating mechanism will be referred to as a button, though alternative shapes or configurations may be used. In one embodiment, the activation mechanism may also be a verbal command.

Selecting and executing a Snap Action to display or post data can be done without the need for taking separate user actions to end the interaction and restore both the data resource and the user's system to their prior status. A Snap Action to fetch data from and/or to post data to a secure repository enhances security and makes it easier to interact with a data resource.

An example for accessing publicly accessible data is as follows. A user clicks on a button for "Temperature." The user's device fetches the current temperature from an open website, and displays the temperature automatically for a preset period of time. In one embodiment, the display lasts for as long as the user holds his or her finger down on the button that initiated the display of the temperature, and then for a preset time of a few seconds after the user releases the button. At the end of the data display time consisting of the hold down time plus the preset time, the user's system is returned to its previous state without further user action, ready to accept a new request to open another app or to select another action for execution, which could be a Snap Action.

An example for accessing confidential or personal data is as follows. The user clicks on the Snap Action button on their device for "bank balance." The selected Snap Action on the user's device logs in to the user's bank account with the user's credential, for just long enough to fetch the user's current bank balance. The Snap Action then immediately logs out from the bank. In one embodiment, the login provides access only to read-only data, to further increase security. The system then displays the balance to the user for a preset period of time, referred to as the display period. Note that the display may be visual, or it may be sound output, or made in another format, such as operating a Braille tactile display. In another embodiment, the data is displayed for as long as the user holds his finger down on the button to see the balance, and optionally for a preset period of a few seconds beyond that. At the end of the data display period, the user's system is returned to its previous state. In one embodiment, touch-and-hold of a button can be used to call for a Snap Action query of this sort. In one embodiment, voice input can be used to select and execute Snap Actions.

Employing Snap Actions provides two significant benefits. First, Snap Actions are easier and faster. After getting and viewing the data requested, or posting data, there is no need for the user to manually restore the user's device to its previous state by clicking "Back" or "Close" in order to use the device again. Second, it is more secure, on the user's device and on the data source side as well. A secure website or database is more vulnerable to attack by a hacker while someone is logged into it. By minimizing the log-in period, and executing automatic log-out promptly, the time when the user is actively logged in is reduced from minutes to a few seconds or even a fraction of a second. Additionally, on the user's device, the data is presented only temporarily, and it is then eliminated from the device. By restoring the device to its prior state, access by others to the data is prevented.

Additionally, it is common for users to forget to log out when they have received the data they requested, so the site must time them out after a period of inactivity such as 5-10 minutes or even more. Snap Action eliminates the need for the user to log out, and improves security by logging in and then logging out promptly, considerably shortening the time of exposure during login.

Of course, the above examples are merely examples. The time that the data is displayed may be limited to while the user is holding down the button, or while the user is holding the button plus a preset time of few seconds, or for a preset time only. The preset display period may be set to any value, globally, by Snap Action type, or on a per-Snap Action basis.

In one embodiment, at any time during the display period, after the user presses the button selecting a Snap Action, the user may employ a control to return the system immediately to its prior state, without waiting for the display period to elapse.

In one embodiment, the user credentials used to access confidential or personal data are stored in a secure vault on the user's device. These credentials can be stored, and still comply with high security standards, because the Snap Action using the credential can permit only read-only access to such data.

Read-only access to data can be established in several ways. One way is to copy the relevant data from a full-featured, password-protected data source to a separate database on the server accessible from outside users but read-only, which can therefore have lower security. Another way is to provide a set of credentials that provide read-only access that is different from the higher security password/credentials used for full access. Or both these methods can be employed together to provide read-only access to a read-only database.

As a general rule, a bank or similar institution can accept lower security for access to data that can be read but not modified, and therefore relax its prohibition of any data or credential residing on a user device, because just sending data out for reading on the phone does not increase the risk of hacking an account.

This means that in a banking context, rather than enabling funds transfer or other such withdrawal or transfer actions that reduce the account balance, the user can only see their balance, past transactions, or other static data. In one embodiment, the user may also be able to make deposits with a Snap Action that can increase the balance in an account but not decrease it.

In one embodiment, the user device is unlocked with a passcode or fingerprint, prior to making selection of a Snap Action available. In other words, the user device may be secured in some way to provide a second factor besides possession of the device to allow access to secure data.

In one embodiment, the user may use a command during the display period to enter a different mode where the session is not ended automatically, but rather switches to full access of the data resource. In one embodiment, this may require entry of a different password, which is not to be stored on the device. In one embodiment, the full access mode enables activities requiring higher security like withdrawing funds from a bank account.

Note that although the discussion above states that a Snap Action for fetching data is read only, there may be other Snap Actions, in one embodiment, that permit posting of data from the user device or another resource to a data destination. The user may post data with a Snap Action, such as their health numbers, location, etc. to a designated data destination, in a particular format. This helps ensure that the data posting capability will not be used to "hack" or otherwise harm the data resource. In one embodiment, a single Snap Action may be used to fetch data from multiple data resources, assemble it into a presentation for viewing. In one embodiment, a single Snap Action may also be used to post data to multiple destinations, with each source or destination logged into as they require, for only the time needed to effect the automatic data transfer at that site. In one embodiment, a single Snap Action can include a data fetching and a data posting component.

In one embodiment, instead of using a button, the system may be initiated and the Snap Action selected by entering a keyword, either by manually typing it or by voice input. Similarly, the output may be displayed visually or by audio or in other output formats.

In one embodiment, the Snap Action may use "screen scraping" to extract the particular data desired from a data resource. This allows using the Snap Action system without making any changes to the underlying server, application, or database program. In one embodiment, a portion or the entirety of the page with the data can be downloaded from the data source and be displayed by the system. In one embodiment, the entire page may be downloaded, and then the Snap Action may format the relevant portion of the data for display to the user. The choice is up to the designer of the Snap Action, in one embodiment.

In one embodiment, the selected Snap Action responds to user requests for Web data using standard HTML queries, which are independent of the device and the browser used for the purpose of querying the Web. Snap Action can also be used to query or post to data resources that are not on the Web, but are located on the local device or are accessible to it via a LAN or WAN or another means.

In one embodiment, in addition to retrieving data from sources, a Snap Action may also be used to securely and quickly post data to a destination. In one embodiment, the system allows the user to select the data to post, logs into the destination system, posts the data, and logs out promptly from the destination system. This minimizes the amount of time the connection between the user device and the destination is open, and the period of time during which the destination is logged into.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a network diagram of one embodiment of a system in which the Snap Action may be implemented. The system includes at least one user device 110, 120. The user device may be a smart phone, tablet computer, a laptop computer, a wearable device, a desktop computer, or another computer system that includes a user interface that enables a user to request data, and the device to provide data to the user. The interface, in one embodiment, may be a screen or similar display. In another embodiment, the display may be projected (e.g. a heads-up type display), or audio output through a speaker or headset.

The user device 110, 120 has one or more Snap Actions, which enables the user to query a data resource for data and/or to post data to a data resource. The data resource may be a user local data resource 125, which may be password-accessible, a remote open public resource 170, or a remote secure resource 160. In one embodiment, user device 110, 120 connects to a data source or destination 160, 170 through a network 150 such as the Internet or through another method such as a local area network (LAN) or other connection, to retrieve or post data.

In one embodiment, to access secure resource 160, user device 110, 120 has secure storage to store login data. In one embodiment, data may be obtained from the resource 160, 170 from a database, via screen scraping, or through another method.

In one embodiment, the system includes an application server 130, which makes the Snap Action(s) available to the user devices 110, 120. In one embodiment, a Snap Action includes an access mechanism associated with a particular data source, whether public, secure, or local. In one embodiment, application server 130 makes the source/destination-specific mechanisms available to the user. In one embodiment, if the user device 110, 120 is a mobile device such as an iOS™ device by APPLE COMPUTERS™ or an ANDROID™ operating system device, application server 130 may be the App Store associated with the operating system or another provider.

Figure 2:
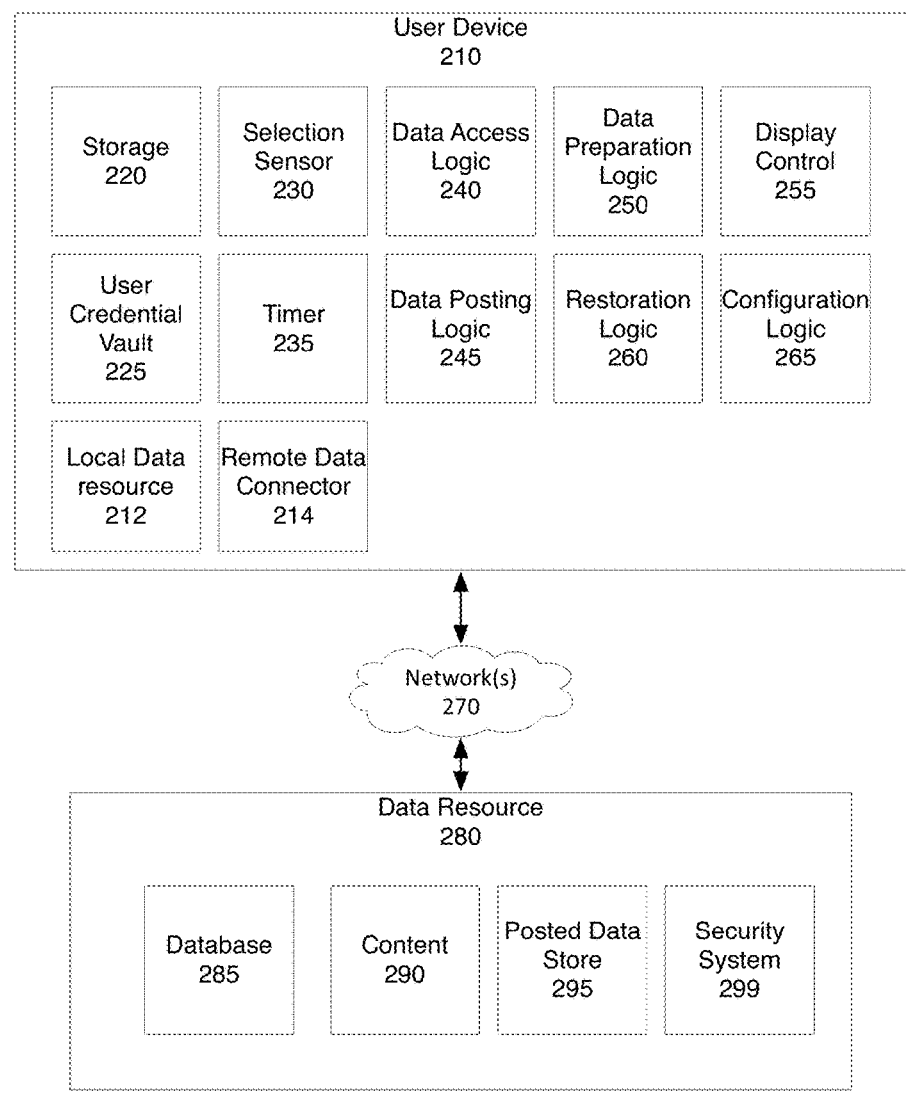
FIG. 2 is a block diagram of one embodiment of the device and an exemplary data source that may be accessed.

FIG. 2 is a block diagram of one embodiment of the device including Snap Action, and an exemplary data resource that may be accessed. The user device 210 may be a smartphone or other type of computer device having an input and output capability.

The user device 210 includes storage 220, where the Snap Action is stored. The Snap Action in one embodiment is a special purpose application to provide access to various data sources, for posting and/or retrieving data. In another embodiment, the Snap Action may be an add-on feature provided to an application. For example, for a calendar application there may be a feature that if you touch the calendar application, your next appointment is shown. Similarly, for a banking application, there may be a feature that if you touch the application icon your current balance pops up. In one embodiment, a Snap Action may be downloaded from a server or other source, or may be created locally.

In one embodiment, for accessing secure resources, user credentials are stored in the user credential vault 225. In one embodiment, these credentials are stored encrypted. In one embodiment, the credentials may be limited credentials allowing access only to read-only data, or allowing only read-only access to data.

Selection sensor 230 detects when the user selected a particular Snap Action. In one embodiment, the selection sensor 230 detects a touch on an icon associated with the Snap Action. In another embodiment, the selection sensor 230 receives a recognized voice command. In one embodiment, voice recognition (not shown) may be implemented outside the system.

When selection sensor 230 detects activation of a Snap Action, in one embodiment, the data access logic 240 accesses data source 280, and obtains the requested data. Data access logic 240 may access data in a database, may scrape data from a website or other data source, or may obtain an entire page including the requested data.

In one embodiment, data access logic 240 includes login functionality, enabling a user to obtain data from a secured data resource 280. In such cases, data access logic 240 utilizes user credentials from vault 220. The data resource 280 may be local, obtained through a direct connection, or may be remote, accessed through a network 270. In another embodiment, if a data deposit is indicated by the selected Snap Action, data posting logic 245 accesses data destination 280, and posts the appropriate data. In one embodiment, data preparation logic 250 prepares the to-be posted data into the appropriate form for the data destination. In one embodiment, user credentials from vault 220 may be used for such data posting as well. For either fetching or posting data, the login time at data resource 280 is kept to a minimum; login is effected only for long enough for the data transfer to occur.

After data is obtained from the data resource 280, data preparation logic 250 prepares the data for display. This may include formatting the data for a clean output. The data is then passed to display control 255, and is displayed to the user. When selection sensor 230 detects that the display period is over, restoration logic 260 restores the user device 210 to its prior state. Similarly, after data is posted to data resource 280, restoration logic 260 restores the user device 210 to its prior state. In one embodiment, restoration logic 260 only operates on secure data sources/destinations and logs the user out of the secure data resource. Display control 255 displays the data obtained, on the user's device. The display may be visual, auditory or in another format.

In one embodiment, when the display starts, timer 235 is initiated. Timer 235 tracks the display period associated with the Snap Action. In one embodiment, the display period is preset using configuration logic 270. In another embodiment, if the user initiates the display by using a touch-and-hold method, the timer is initiated when the user lets go, and continues the display for a few more pre-set seconds beyond the hold time. In one embodiment, if the user initiates the Snap Action using a touch-and-hold method, a timer is used to provide a timeout period, after which the display will be reset even if the user is still holding to activate the system.

Configuration logic 265 in one embodiment, configures the Snap Action, enabling access to designated data resources 280. In one embodiment, configuration logic 265 also allows the user to set the display period, the output format, the location of the data for posting, and the types of initiation detected by selection sensor 230.

Data resource 280 is accessed via remote data connector 214, and may be an external website, an external database, or another source/destination. Data resource 280 includes in one embodiment a database 285, or other content 290, from which the Snap Action on user device 210 may obtain data.

In one embodiment, resource 280 may also include posted data store 295, where data posted by the Snap Action is stored. In one embodiment, data resource 280 includes security system 299, which requires user to log into the data source to retrieve or post data. In one embodiment, using the credential vault 220, the user may meet the requirements of security system 295.

Local data resource 212 is also accessible for Snap Actions. In one embodiment, the user downloads a Snap Action application, or the Snap Action system is enabled on an already available application on the user's device.

Figure 3:
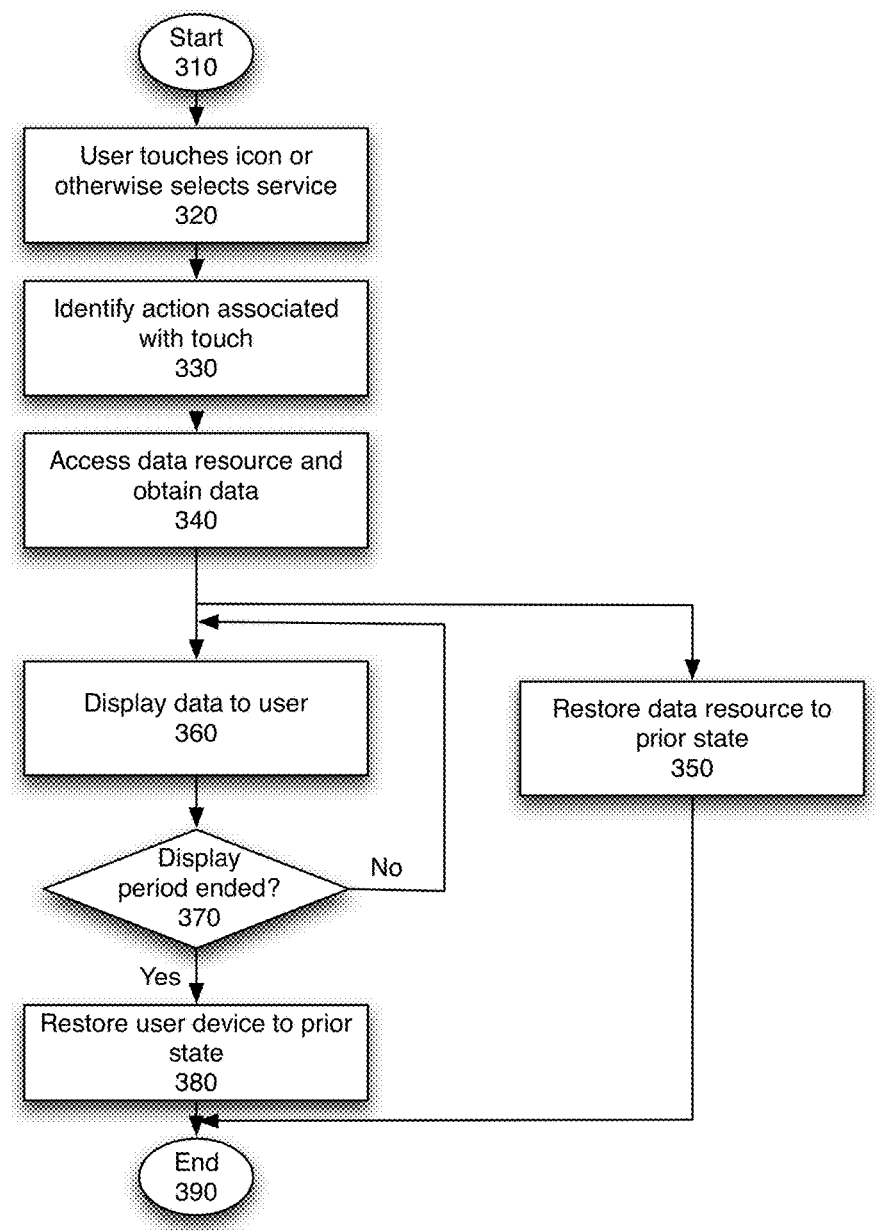
FIG. 3 is a flowchart of one embodiment of obtaining and temporarily displaying data to a user.

FIG. 3 is a flowchart of one embodiment of a Snap Action for obtaining and temporarily displaying data to a user. The process starts at block 310.

At block 320, the user selects the Snap Action. In one embodiment, this may be done by touching the icon associated with the Snap Action using a hand or stylus on a touch screen-based system, or a mouse or keyboard command on a non-touch screen system. Alternatively, the Snap Action may be selected using a verbal command, double clicking something, or in some other way.

At block 330, the Snap Action's function is identified. As noted above, the Snap Action may be to obtain data locally or remotely, via access to a database or other data source.

At block, 340, the data source is accessed and the data is obtained. Obtaining the data may require the use of user credentials. In one embodiment, obtaining the data may require scraping data from a downloaded page, if the wanted data is not available in suitable form from a database or similar such resource accessible to the Snap Action.

At block 350, the data source is restored to its prior state. In one embodiment, if the data source required log-in, the system logs out of the data source. In one embodiment, if the data access required changing a default page, or display format for the data source, that too is returned to the original format. Where data is open and public, in one embodiment, no restoration of the source is needed, and this may be omitted.

At block 360, the data is displayed to the user. In one embodiment, this may occur concurrently with or prior to restoring the data source. In any case, this is intended to occur rapidly after the user selects the Snap Action.

At block 370, the process determines whether the display period has ended. In one embodiment, if the Snap Action is invoked by touching and holding; the display period may end when the user lifts his or her finger, or a short period thereafter.

The display period may be for a pre-determined period of time, or it may end on clicking on a cancel button or otherwise actively ending the period, or some combination of the methods for determining the display period, such as combined hold down of the button plus a preset time.

If the display time is not yet ended, the process continues to display the data. In one embodiment, the system forces an end of display after some pre-determined time has elapsed, e.g. after 30 seconds.

Once the display period ends, at block 380 the user's device is restored to its prior state. In one embodiment, this includes stopping the display of fetched data and emptying any cache or other local storage where the data may be found on the user device. The process then ends at block 390.

Figure 4:
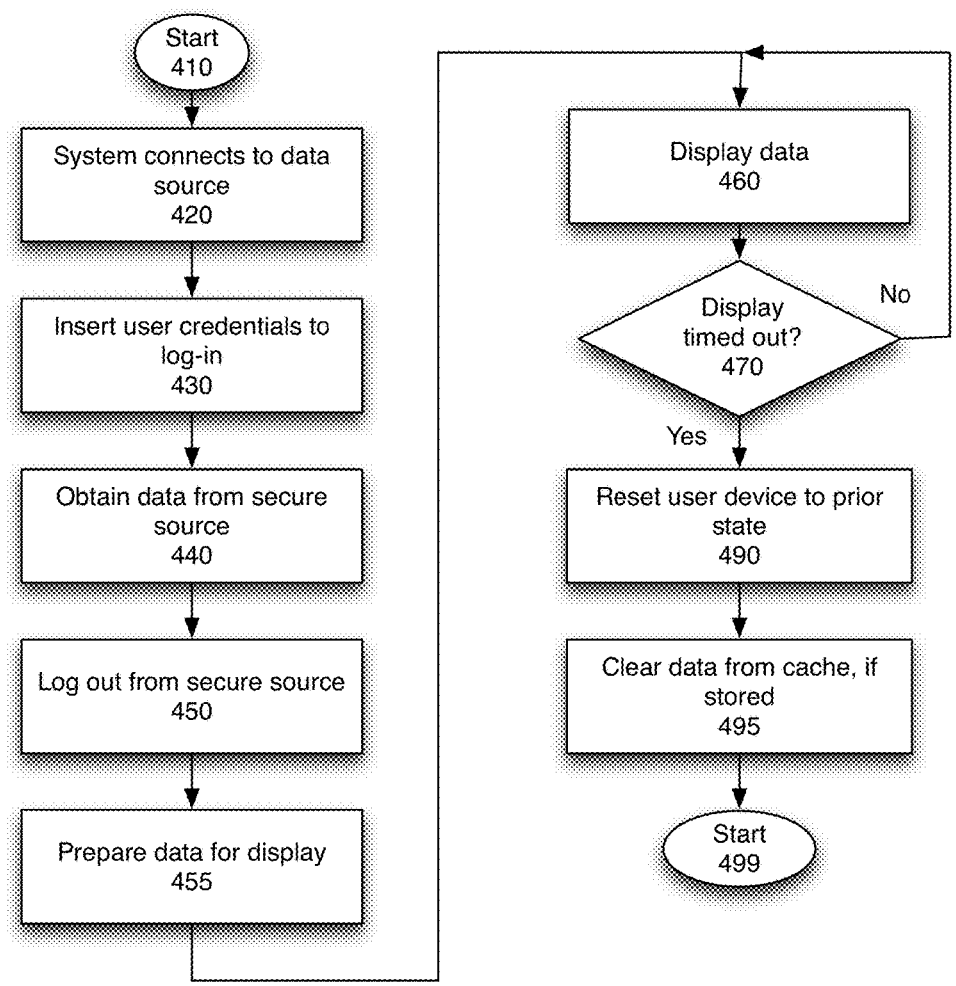
FIG. 4 is a flowchart of one embodiment of obtaining the data from a secured source.

FIG. 4 is a flowchart of one embodiment of obtaining the data from a secured source and displaying it to a user. At block 410, the process starts.

At block 420, the system connects to the data source. In one embodiment, the data source is a server accessed via a network. Alternatively, the data source may be local.

At block 430, the system inserts the user credentials to log in. In one embodiment, the user credentials may be fully featured credentials, e.g. user name & password to access a bank account and enable all transactions with the bank, but the database accessed may be a read-only data source. In one embodiment, the user credentials may permit only access to read-only data such as the user's balance or flight time and flight number, but not to change data, such as transferring money out of a bank account or changing a plane reservation.

At block 440, the data is obtained from the source. In one embodiment, the source provides the data in a standard form, such as HTML or XML or text or spreadsheet format to the Snap Action.

At block 450, the system logs out from the data source. Logging out ensures that the data source is promptly restored to its pre-access pristine state after a login time that can be much shorter than the time needed to view the data. Note that while this is presented in flowchart form, the logging out and the preparation and display occur concurrently, in one embodiment, as they are not dependent on each other.

At block 455, the data fetched from the data resource is prepared for display. In one embodiment, this entails extracting the desired data from a downloaded page. In another embodiment requires no preparation, the downloaded HTML page is ready for display. In another embodiment, the data may be reformatted into a data format that can be displayed by the user's device.

Figure 5:
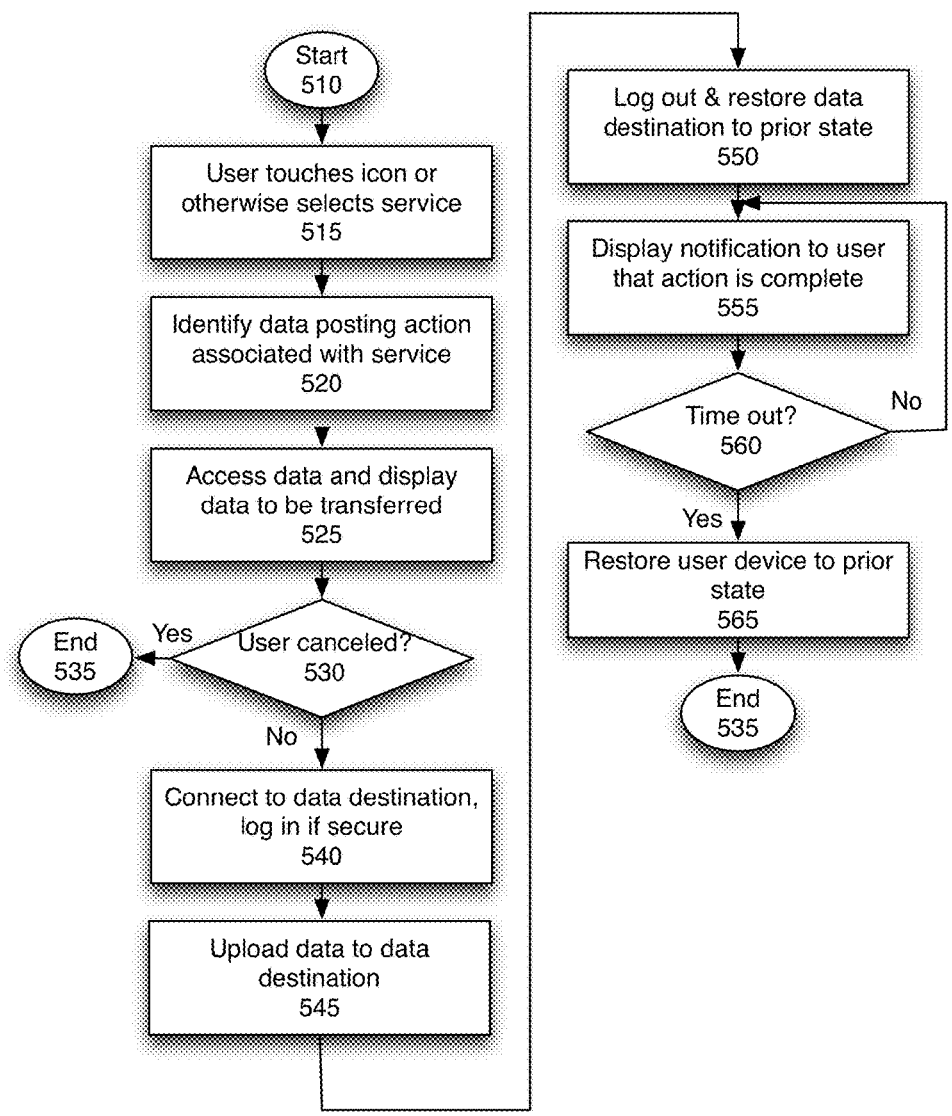
FIG. 5 is a flow chart of the system posting data to a password-protected data destination.

At block 460, the process displays the data to the user on the user device. In one embodiment, the display shows the results on the user's screen, as illustrated in FIG. 5. Alternatively, display may reference other methods of providing the data to the user, whether through text, an image, HTML or audio output.

At block 470, the process determines whether the display has been timed out. For maximum safety and ease of use, the system automatically times out the display after a period of time. In one embodiment, the period of time may be 10 seconds, 30 seconds, or a minute. In one embodiment, the user may set the display time, e.g. the timer to time out the display, based on the Snap Action, Snap Action category, or globally. If display time has not yet ended, the process returns to block 460 and continues to retain the data for display.

In one embodiment, if the display was triggered by touching and holding the icon, the system may start the time-out evaluation after the user releases the icon. The preset time may be 5 seconds, shorter or longer. In one embodiment, this timer may be set on a per Snap Action, per Snap Action category, or global basis. If the output is audio rather than visual, in one embodiment the Snap Action states the result of the display once and retains it for the limited time described above (e.g. the display time) for replay, prior to deleting it. If the display time has ended, the process continues to block 490.

At block 490, the user's device is reset to its prior status, restoring the user device so it is ready to be used again.

At block 495, the data is cleared from the cache or other temporary storage on the user's device. This ensures that once the process is ended, no one can recover that data from the user's device. The process then ends at block 499.

FIG. 5 is a flow chart of the system posting data to a password-protected data resource. The process starts at block 510.

At block 515, the user touches the button or otherwise selects a Snap Action. At block 520, the Snap Action is identified as a particular data posting Snap Action, e.g. a Snap Action that is designed to enable the transfer of data from the user's device (or an associated device) to a predetermined data destination.

At block 525, in one embodiment, the data is accessed, and in one embodiment displayed to the user. In one embodiment, this enables the user to cancel the data transfer, at block 530. In one embodiment, this is displayed for a limited time, and unless the user "cancels" during that time, the process continues automatically. In one embodiment, this step may be skipped. If the user cancels the data posting, the process ends at block 535. In one embodiment, the user may cancel by hitting a cancel button, releasing the invocation button, or taking a similar action.

If the user does not cancel the data transfer, at block 540 the system connects to the data destination. If the data destination is a secured destination, the system also logs in at this point. As noted above, logging in uses the user credentials securely stored on the user device.

At block 545, the data is posted to the destination. In one embodiment, the user device may translate the data, to an appropriate form for the particular destination.

At block 550, the Snap Action logs out of the data destination, and restores the data destination to its prior state. In one embodiment, for open, public destinations, this step may be skipped. Note that this occurs promptly and may occur in parallel with the display steps below.

At block 555, the user device displays a notification to the user that the posting has been completed. This display may be via an image, data, or audio output.

At block 560, the process determines whether the notification should be timed out. In one embodiment, the notification is displayed only for a few seconds, to provide confirmation to the user. After that, the system times out, and the user device is restored to its prior state at block 565. In another embodiment, the user may need to release the notification, prior to the user device being restored to its prior state. The process then ends at block 535.

Figure 6:
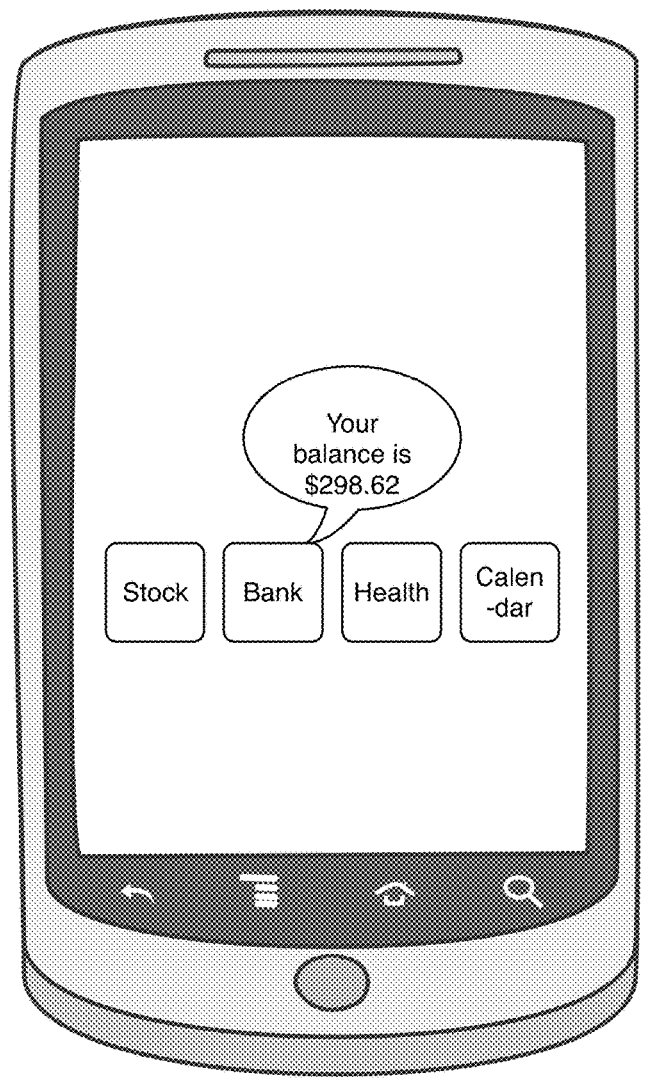
FIG. 6 is an exemplary screen shot of a user interface.
Figure 7:
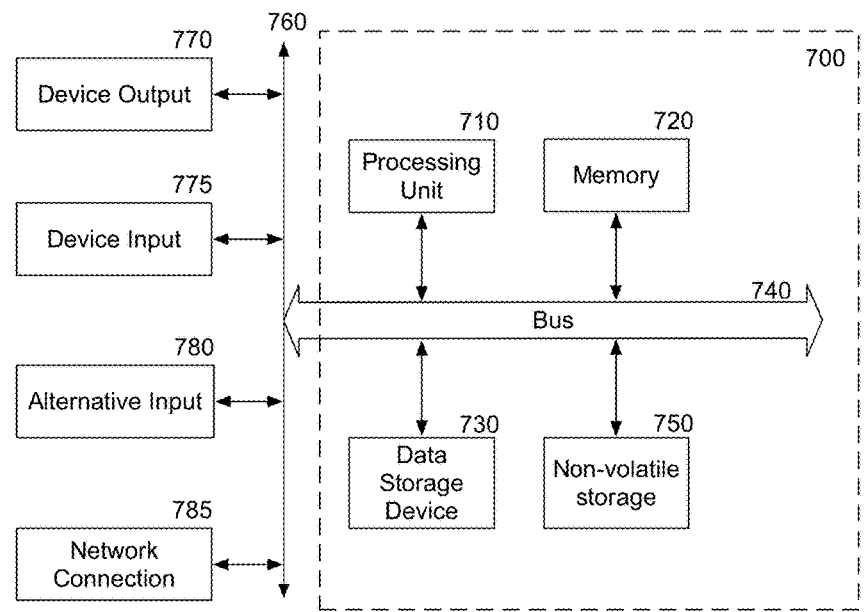
FIG. 7 is a block diagram of one embodiment of a computer system that may be used with the present invention.

FIG. 6 is an exemplary screen shot of a user interface. Three icons illustrate some Snap Actions that may provide the features described above. The "Bank" button accesses the user's linked bank, and obtains their current balance, or other relevant banking information. In one embodiment, the Snap Action may be configured to obtain a balance in a checking, savings, money market, or other account, or in a plurality of accounts. In one embodiment, it can show the current balance in an account and recent activity in that account. The "Stock" button looks up a stock quote on a public site, such as a site supported by NASDAQ™. In one embodiment, the user, when setting up the Snap Action, selects which stock quote(s) to obtain using the Snap Action. The "Health" button enables the user to post confidential health data to a server, such as their doctor's system, keeping the time logged into the target system very short, thereby enhancing its security. The "Calendar" icon allows the user to look up their next appointment in their local calendar. This allows a one-touch look-up from a local data source, which is an add-on to an existing application, e.g. the standard calendar application FIG. 7 is a block diagram of a particular machine that may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment, the system also includes a data storage device 730 such as a magnetic disk or optical disk and its corresponding disk drive, or flash memory or other storage which is capable of storing data when no power is supplied to the system. Data storage device 730 in one embodiment is coupled to bus 740 for storing information and instructions.

The system may further be coupled to an output device 770, such as a liquid crystal display (LCD) coupled to bus 740 through bus 760 for outputting information. The output device 770 may be a visual output device, an audio output device, and/or a tactile output device (e.g. braille display, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 740, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance such as a kiosk or a vehicle including a subset of the computer hardware components described above. For example, the appliance may include a processing unit 710, a data storage device 730, a bus 740, and memory 720, and only rudimentary communications mechanisms, such as a small button set and screen that permits the user to communicate in a basic manner with the device. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of a particular machine implemented as a computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   detecting a selection of a desired action by a user on a user device, the action consisting of obtaining display data comprising content obtained from a data source for display on the user device;
   connecting to a data source by logging into the data source;
   obtaining the display data from the data source associated with the selection using access data;
   disconnecting from and logging out from the data source after obtaining the display data, a log-in period between the logging in and the logging out of a first length;
   displaying the display data to a user on the user device for a limited display period, the limited display period having a second length longer than the log-in period;
   ending the display of the display data to the user at an end of the limited display period; and
   restoring the device to a prior state after the limited display period, such that the display data is deleted from local memory and cache and is not accessible to the device.

2. The method of claim 1, further comprising:
   the logging into a secure data source to obtain the display data, utilizing authentication data from a secure vault accessible to the user; and
   the authentication data is removed from the cache upon logging out.

3. The method of claim 2, further comprising:
   storing log-in credentials for the secure data source in a secure data vault.

4. The method of claim 3, wherein the log-in credentials provide access to a read-only data source, which allows no change to be entered into the data source.

5. The method of claim 1, further comprising:
   initiating the display upon detection of a user selection of a Snap Action, associated with a limited display period; and
   after detecting a user release of the selection of the Snap Action, continuing the display period for a preset limited period of time.

6. The method of claim 5, wherein the preset period of time is set by one of: per Snap Action, and per Snap Action type, as determined by the user.

7. The method of claim 1, further comprising:
   detecting a selection of a desired action on a device;
   posting data to a data destination associated with the selection;
   displaying a confirmation of the posting to a user for the limited display period; and
   restoring the device to the prior state.

8. The method of claim 7, wherein the data posted to the data resource is in a prescribed format, so that the Snap Action does not compromise security.

9. A method comprising:
   detecting a selection of Snap Action on a user device by a user, by one of:
   entering a keyword, entering a key phrase, selecting from a list, and selecting an icon;
   accessing a remote data resource associated with the snap action, and logging into the remote data resource using access data, and one of: obtaining display data from the data resource, or posting data to the data resource;
   disconnecting and logging out from the remote data resource;
   displaying the display data to a user on the user device for a limited display period, wherein the limited display period is longer than a period between the logging in and the logging out of the remote data resource; and
   restoring the user device to a prior state, including deleting the display data from local memory and cache, such that the display data is not on the user device after the limited display period.

10. The method of claim 9, wherein the logging into the data resource uses authentication data from a secure vault.

11. The method of claim 10, further comprising:
automatically logging out of the data resource immediately after completing the obtaining of the data or the posting of the data; and
deleting the access data from a cache.

12. The method of claim 10, wherein the data posted to the data resource is in a prescribed format, so that the Snap Action does not compromise security of the data resource.

13. A user device comprising:
a memory to store one or more Snap Actions, each Snap Action associated with a data resource and designed for temporary access to the data resource;
a selection sensor to detect a selection of a particular Snap Action, the selection by one of: entering a keyword, entering a key phrase, selecting from a list, selecting an icon;
a data access logic to establish a connection with the particular data resource associated with the Snap Action and logging into the particular data resource using access data, and one of: obtain display data for display on the user device from the data resource, or post data to the data resource, and the data access logic to disconnect and logging out from the data resource;
a user output to display the display data to a user for a display period, the display period longer than a connection period the period between the logging in and the logging out from the particular data resource; and
a restoration logic to restore the user device to a prior state, such that the display data is deleted and not accessible to the user device.

14. The user device of claim 13, further comprising:
the data access logic to use user credentials from a credential vault to log into the data resource, when the data resource is a secured data resource.

15. The user device of claim 14, further comprising:
the restoration logic to restore the secured data resource, by automatically logging out of the secured data resource immediately after completing the obtaining of the data or the posting of the data, and delete the access data from cache in the user device.

16. The user device of claim 13, further comprising:
the restoration logic to erase the display data from a cache in the user device, such that the data cannot be recovered from the user device.

17. The user device of claim 13, further comprising:
a timer to control the display period, the timer controlling the display period by one of: terminating the display after a preset period has elapsed, or terminating the display after a shorter period has elapsed after a user releases the display.

18. The user device of claim 13, wherein the selection comprises a user touching an icon, and the display period ends when the user releases the icon.

19. The method of claim 9, wherein the selection comprises a user touching an icon, and the limited display period ends when the user releases the icon.

20. The method of claim 9, wherein the limited display period is a preset time, set based on one of: per Snap Action, and per Snap Action type, as determined by the user.

* * * * *